G. F. MURCH.
TROLLEY WHEEL.
APPLICATION FILED DEC. 7, 1910.

1,043,961.

Patented Nov. 12, 1912.

Witnesses:
Geo. F. Schwarz.
Sully Russo.

Inventor
George F. Murch
By his Attorneys
Redding Kiddle & Austin

UNITED STATES PATENT OFFICE.

GEORGE F. MURCH, OF NEW YORK, N. Y.

TROLLEY-WHEEL.

1,043,961.  Specification of Letters Patent.  Patented Nov. 12, 1912.

Application filed December 7, 1910.  Serial No. 596,051.

*To all whom it may concern:*

Be it known that I, GEORGE F. MURCH, a citizen of the United States, residing in the borough of Manhattan of the city of New York, in the State of New York, have invented certain new and useful Improvements in Trolley-Wheels, of which the following is a specification.

The primary object of my invention is to provide a trolley wheel that shall be completely and effectually insulated from the axle or spindle on which it is revolved.

The further objects of the invention are to provide suitable anti-friction bearings for the trolley wheel, to overcome the difficulties of lubrication, to prevent sparking, and to prolong the life of the trolley wheel.

The invention consists in the new and novel features of construction and combinations of parts hereinafter set forth and claimed.

Figure 1:
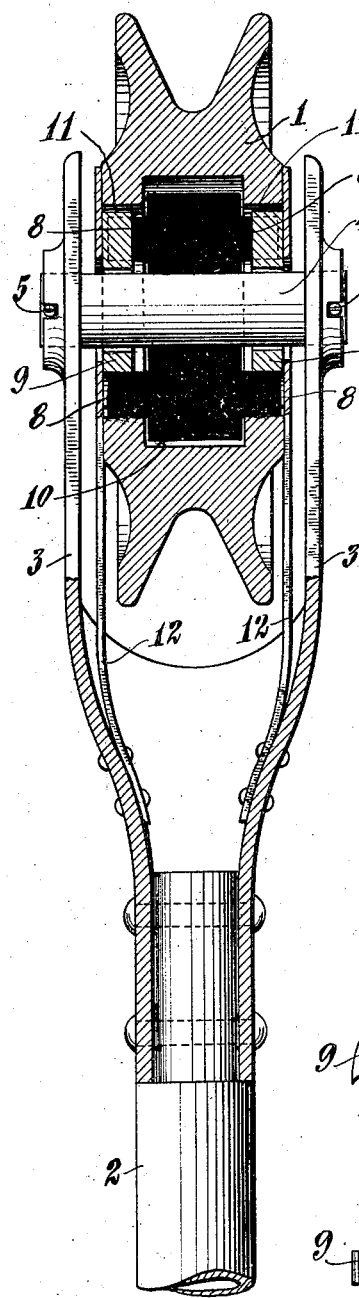
Figure 2:
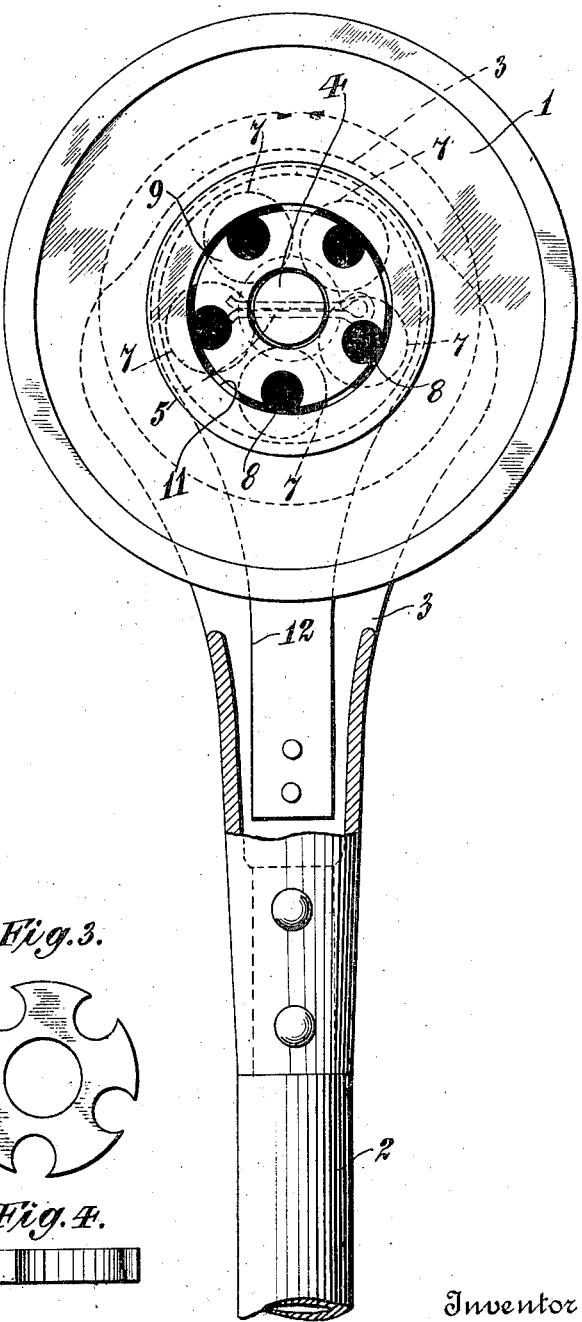
Figure 3:
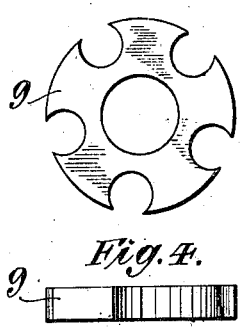
Figure 4:
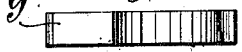

In the accompanying drawings: Figure 1 is a vertical section of a trolley wheel embodying my invention. Fig. 2 is a side elevation of the same partly in section. Fig. 3 represents the anti-friction roller retainer and separating device. Fig. 4 represents a detail view of the same.

The trolley wheel 1 is mounted on a pole 2 comprising forks 3 constructed in the usual manner. The wheel is rotatable upon the fixed axle or spindle 4 secured in the forks of the trolley in any suitable manner, as by the cotter pins 5. The wheel is mounted upon anti-friction rollers 7 which are made of any suitable non-conducting material, such as fiber. The trunnions 8 of these rollers are suitably spaced and retained by the floating retainer 9, which has its central opening of sufficient diameter to prevent contact with the axle. The trolley wheel rotates upon the segments of the trunnions which project above the periphery of the retainer. The rollers are confined in a suitable recess 10 provided in the hub of the wheel, and bear on the axle.

In order to conduct the current from the wheel to the pole, suitable disks or strips 12 of conducting material are secured by any suitable means to the trolley pole, and engage with the trolley wheel. Such disk is provided with a large central opening, so that it does not contact with the axle 4.

In operation the weight of the trolley wheel is transmitted to the axle through the trunnions and the rollers which rest directly upon the axle. These rollers contact with and travel around the axle, having motion imparted thereto by the trunnions, which are directly in engagement with the trolley wheel. The bearing is extremely compact and friction is greatly reduced, since the trolley wheel contacts only with the projecting surfaces of the trunnions, which themselves tend to rotate in the same direction and at the same rate of speed as the trolley wheel.

By means of the construction the current is taken from the trolley wheel directly to the trolley pole through a path entirely independent of and insulated from the axle, and since the axle does not form a part of the circuit, all sparking, with the attendant injurious effects upon the axle is prevented. Very little lubrication is required, and as there is no sparking the lubricant is not destroyed. Also friction is greatly reduced by the construction and arrangement of the bearing.

It is obvious that various changes in the details of construction shown in the drawings may be made without departing from the spirit of the invention, provided the means set forth in the following claims be employed.

I claim as my invention:

1. The combination of a trolley pole, an axle secured to said pole, a trolley wheel, electrically non-conducting bearings for said trolley wheel, comprising rollers out of engagement with the wheel, of non-conducting material rotatable on the axle and said rollers having trunnions of reduced diameter out of engagement with the axle which engage with and support said trolley wheel and hold same out of contact with the axle, retainers held out of contact with the axle and having restricted openings engaging said trunnions so as to permit segments thereof to project beyond the periphery of the retainers to bear on the trolley wheel, and means for conducting an electric current from the trolley wheel to the trolley pole independently of the axle.

2. The combination with a trolley pole, a non-rotatable axle secured to said trolley pole, and a trolley wheel having a recess, of a bearing for said trolley wheel comprising non-conducting rollers rotatable on said axle in said recess and out of engagement with the wheel, trunnions secured to said rollers, a retainer held out of contact with said axle and having restricted openings engaging said trunnions and permitting segments of said trunnions to project beyond the periphery thereof, said projecting portions being adapted to form a bearing for the trolley wheel, and an electric conductor held out of contact with the axle and passing directly from the trolley wheel to the trolley pole.

3. The combination of a trolley pole, an axle secured thereto, an annular wheel, a plurality of rollers arranged circumferentially around said axle and having trunnions of reduced diameter at the ends thereof, rings out of contact with said axle receiving said trunnions, said trunnions projecting beyond the edges of said rings and rolling on the inner side of said wheel, said wheel being insulated from said axle through said rollers, and means for conducting current from said wheel to said pole.

This specification signed and witnessed this 28th day of November, A. D. 1910.

GEORGE F. MURCH.

Signed in the presence of—
AMBROSE L. O'SHEA,
N. A. SMITH.

Copies of this patent may be obtained for five cents each, by addressing the "Commissioner of Patents, Washington, D. C."